Jan. 13, 1931.   H. NYQUIST   1,788,470
ELECTROOPTICAL SYSTEM
Filed May 26, 1928
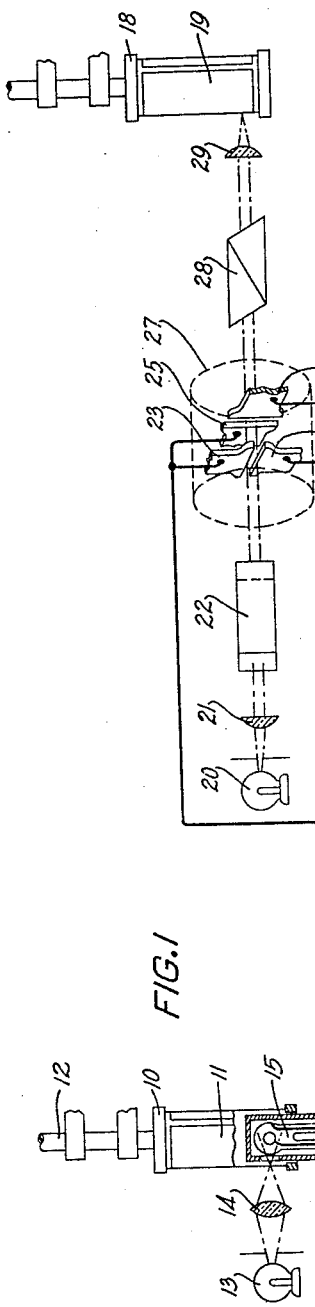
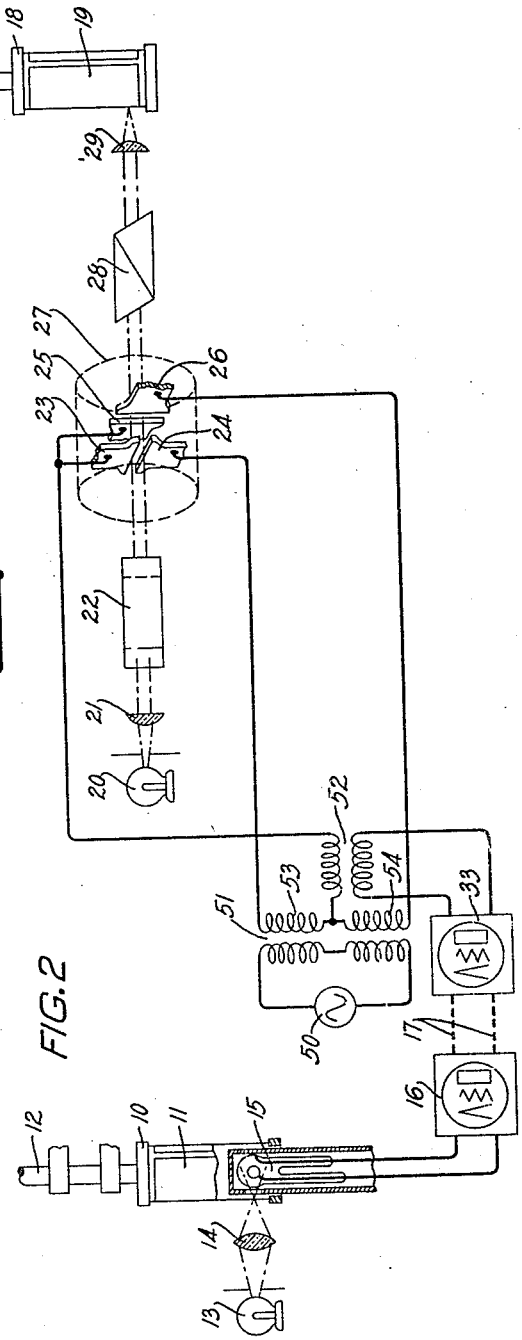
INVENTOR
HARRY NYQUIST
BY
ATTORNEY Patented Jan. 13, 1931

1,788,470

UNITED STATES PATENT OFFICE

HARRY NYQUIST, OF MILLBURN, NEW JERSEY, ASSIGNOR TO AMERICAN TELEPHONE AND TELEGRAPH COMPANY, A CORPORATION OF NEW YORK

ELECTROOPTICAL SYSTEM

Application filed May 26, 1928. Serial No. 280,887.

This invention relates to electro-optical systems, and more particularly to apparatus and methods for controlling light by the Kerr effect.

The principal object of the invention is the improvement of the operating characteristic of light valves of the type in which a beam of polarized light is passed through a medium which becomes doubly refracting under the influence of an electric field.

Systems have been devised heretofore in which two crossed light polarizing devices or Nicol prisms and a device known as a Kerr cell, positioned intermediate the prisms, are employed for controlling the illumination of an object in accordance with the electromotive force impressed across the two electrodes of the Kerr cell. In such a system, the amplitude of light passing through the second Nicol prism (that is, the one remote from the source of light) and, therefore, the amplitude of the light reaching the object to be illuminated, is proportional to the square of the voltage impressed on the electrodes of the Kerr cell. Since the intensity of light varies as the square of the amplitude, the intensity of the light reaching the object to be illuminated varies as the fourth power of the voltage impressed on the Kerr cell. Such a system may be used for reproducing pictures electro-optically, for example. When so used, the disadvantage is present that certain portions of the light sensitive receiving surface are greatly over-exposed, thus resulting in the distortion of the reproduction.

In accordance with the present invention, an arrangement is provided whereby the amplitude of the light reaching the object to be illuminated varies in direct proportion to the amplitude of the controlling electromotive force and, therefore, the intensity of the light reaching the object is proportional to the square of the controlling voltage. If the controlling voltage varies in accordance with the tone values of elemental areas of a picture or object, an image of which is to be produced, the light reaching the corresponding elemental areas of the image or picture receiving surface is closer to the value required for distortionless reproduction than is the case in similar systems devised heretofore.

In one of the specific embodiments of the invention herein shown and described, the device for doubly refracting light comprises a suitable substance such as nitro-benzol, and two pairs of electrodes, the planes of the adjacent surfaces of one pair preferably being perpendicular to the planes of the surfaces of the other pair. Two voltages are impressed on the device, one being the controlling voltage in accordance with the amplitude variations of which it is desired to control the amplitude or intensity of the transmitted light. The second voltage has a fixed characteristic and may, for instance, be from a local source. The controlling voltage may be the voltage of the received picture current. These voltages are impressed on the light rotating device in such a manner that the sum of the two voltages is impressed on one pair of the electrodes and the difference of the two voltages is impressed on the other pair.

A more detailed description of the invention follows and is illustrated in the accompanying drawing.

Figure 1 of the drawing is a diagrammatic showing of a picture transmission system embodying features of the invention.

Fig. 2 shows a modification of the picture transmission system shown in Fig. 1.

In Fig. 1, the drum 10 of transparent material having a picture representation 11 mounted thereon is driven by a motor coupled to the shaft 12 to cause the drum to rotate about its axis and at the same time to move slowly in an axial direction. Light from source 13 is focused by means of lens 14 on the picture film 11 so as to illuminate a small area thereof at a time. As the drum is driven, the small spot of light illuminating the film, in effect describes a helical path thereon, thus illuminating the elemental areas of the film in succession. The light passing through the picture film impinges on the photoelectric cell 15, thereby producing a current which varies in accordance with the tone values of the successively scanned elemental areas of the picture. This current is amplified by the vacuum tube amplifier 16 and transmitted to the picture receiving station over the transmission channel 17.

At the receiving station, a picture drum 18, similar to the drum 10 at the transmitting station, having a light sensitive picture receiving surface 19 mounted thereon, is driven in synchronism with the drum 10 so that the spot of light from source 20 reaching the light sensitive surface in effect describes a helical path thereon. Light from source 20 passing through lens 21 and reaching the Nicol prism 22 in substantially parallel rays is polarized by the action of the Nicol prism. The polarized light passes between the adjacent surfaces of the pairs of electrodes 23, 24 and 25, 26, respectively, of the device 27. Electrodes of this device are positioned in a vessel containing a suitable substance, such as nitro-benzol, which has the property of doubly refracting light when subjected to the action of an electric field. The light reaching the device 27 is polarized at an angle of about 45° with respect to the planes of the adjacent surfaces of each pair of electrodes. After passing through the device 27, the light from source 20 passes through a second Nicol prism or analyzer 28 and lens 29 and then impinges on the light sensitive surface 19. The image current received over transmission channel 17 after being amplified by the vacuum tube amplifier 33 is impressed on the primary winding of transformer 34. A unidirectional potential from a local source 30 is impressed across equal resistance elements 31 and 32 connected in series. Resistance element 31 is connected in series with the secondary winding of transformer 34 to one pair of electrodes 23, 24 of device 27. Resistance element 32 is connected in series with the secondary winding of transformer 24 to the other pair of electrodes 25, 26 of device 27. The analyzer prism 28 is preferably rotated about its axis to such a position that when no image current is being received, substantially no light reaches the light sensitive surface 19.

In order to compare the operation of the system just described employing a device 27 having two pairs of electrodes with a similar system employing a device similar to device 27, but having only one pair of electrodes on which the potential of the incoming image current is impressed, let us first assume that the potential of the image current impressed on the secondary winding of transformer 34 is equal to E. Let us further assume that the plane of polarization of light reaching the Kerr cell employing a single pair of electrodes makes an angle of 45° with the planes of the parallel adjacent surfaces of the electrodes. This light may be resolved into a component parallel to the planes of the adjacent surfaces of the electrodes and an equal component at an angle of 90° therefrom. When the voltage E is applied to the electrodes, it is found that these two components are transmitted with different velocities according to the Kerr effect. The difference of the phase displacements suffered by these components on passing between the electrodes is proportional to $E^2$. The amplitude of the light wave passing through the analyzer prism whose axis is rotated 90° from that of the polarizer prism is proportional to the sine of half the difference of the phase displacements of the two components. For small angular differences, the amplitude of the light transmitted is substantially directly proportional to the difference in phase displacements and hence to $E^2$. Since the intensity of the light varies as the square of the amplitude, it is proportional to $E^4$.

When employing the four-electrode device 27, as shown in Fig. 1, the difference in phase displacement $\delta_a$ suffered by the light components passing between electrodes 23, 24 is counteracted by the difference in phase displacement $\delta_b$ caused by the second pair of electrodes 25, 26, so that the total difference in phase displacement for the device 27 is $\delta = \delta_a - \delta_b$. Assuming that the potential of the incoming image current impressed on the secondary winding of the transformer 34 is $E$ and the potential of source 30 is $2e$, then the potential impressed on electrodes 23, 24 is $E+e$ and the potential impressed on electrodes 25, 26 is $E-e$. Then according to the Kerr effect:

$$\delta_a = k(E+e)^2 = k(E^2 + 2Ee + e^2)$$
$$\delta_b = k'(E-e)^2 = k'(E^2 - 2Ee + e^2)$$

The constants $k$ and $k'$ depend upon the design of the device 27. Assuming that $k = k'$, then $$\delta = \delta_a - \delta_b = 4keE.$$

Since the amplitude of the light leaving the analyzer prism 28 is approximately proportional to $\delta$, it is apparent that the amplitude is also approximately proportional to E instead of $E^2$ as in the two-electrode Kerr cell. Since the intensity of light is proportional to the square of its amplitude, it is proportional to $E^2$ instead of $E^4$ as in the two-electrode Kerr cell.

The system shown in Fig. 2 is similar to that shown in Fig. 1 except that a different type of circuit is employed for energizing the device 27. The same numerals as were employed to designate the elements in Fig. 1 are used to designate similar elements in Fig. 2. A constant source of alternating current 50 is connected to the primary winding of transformer 51 and the image current is impressed on the primary winding of the transformer 52. The secondary winding of the transformer 51 comprises two equal portions 53 and 54. Portion 53 of the secondary winding is connected in series with the secondary winding of transformer 52 to one pair of electrodes 23, 24 of device 27, while portion 54 is connected in series with secondary winding of transformer 52 to the other pair of electrodes 25, 26.

With reference to the system shown in Fig. 2, let the received image current be a modulated carrier wave such that the potential of the image current impressed on the secondary winding of the transformer 52 is represented by $$E = F(t) \cos \omega t$$

where $t$ represents time, $F(t)$ represents the unmodulated image current potential and $\omega$ represents $2\pi$ times the carrier frequency. Let the potential $e$ impressed across each half of the secondary winding of transformer 51 by the current source 50 be represented by $$e = c \cos \omega' t$$

where $c$ is a constant and $\omega'$ is $2\pi$ times the frequency of source 50. The values of $\omega$ and $\omega'$ may be alike or different. Then $$\delta = 4kEe = 4kc \cdot F(t) \cos \omega t \cos \omega' t$$

This expression becomes $$\delta = 2kc \cdot F(t) [\cos(\omega - \omega')t + \cos(\omega + \omega')t]$$

Since $\delta$ is proportional to the amplitude of the light wave leaving the analyzer prism 28, this amplitude is proportional to the image current potential $F(t)$. The intensity of the light leaving the analyzer prism 28 is proportional to the square of the amplitude and therefore to $\delta^2$. Hence $$\text{Intensity} = KF^2(t) [\cos^2(\omega - \omega')t + 2 \cos(\omega - \omega') \cos(\omega + \omega')t + \cos^2(\omega + \omega')t]$$

$$= \frac{KF^2}{2}(t) [2 + \cos 2(\omega - \omega')t + 2 \cos 2\omega t + 2 \cos 2\omega' t + \cos 2(\omega + \omega')t]$$

In order to have no pattern, it is necessary to have $2\omega$, $2\omega'$ and $2(\omega - \omega')$ each satisfy the condition of either being equal to zero or else large enough so that the period be small in comparison with the detail transmitted which is dependent upon the rate of change of tone value as the picture is being scanned.

It is within the scope of the invention to employ, instead of a light source, a source of energy having a frequency range which extends above or below the visible spectrum and the appended claims should be interpreted with this in mind. The invention, moreover, is not limited to a picture transmission system but may be employed in other systems, as, for example, television or sound recording systems.

What is claimed is:

1. An electro-optical system comprising a source of polarized light, means for utilizing light from said source, and means including a source of variable electromotive force for doubly refracting light from said source so as to cause the amplitude of the light waves reaching said utilizing means to vary substantially in direct proportion to the variations in said electromotive force.

2. In an electro-optical system comprising a source of polarized light, means for doubly refracting a light wave in response to the action of an electric field, means for applying a plurality of electromotive forces to said light refracting means for setting up an electric field therein such that the amplitude of the light wave in a given plane is substantially directly proportional to the amplitude of one of said electromotive forces.

3. In an electro-optical system, a plurality of pairs of electrodes, the planes of the adjacent surfaces of one pair of electrodes being substantially perpendicular to the planes of the adjacent surfaces of the other pair, a substance between said electrodes capable of doubly refracting light when subjected to the action of an electric field, two sources of electromotive force, and means for impressing the sum of two electromotive forces from said sources upon one pair of electrodes and the difference of said electromotive forces upon the other pair of electrodes for subjecting said substance to the action of an electric field.

4. In combination, two pairs of electrodes, means for simultaneously setting up two electric fields inclined at an angle to each other for modifying a characteristic of a beam of light, said means including a source of electromotive force and circuits for simultaneously impressing energy from said source upon both said pairs of electrodes.

5. In combination, two pairs of electrodes, means for simultaneously setting up two electric fields inclined at an angle to each other for modifying a characteristic of a beam of light, said means including a plurality of sources of electromotive force and circuits for simultaneously impressing the sum of two electromotive forces derived from said sources on one pair of electrodes and the difference of said electromotive forces on the other pair of electrodes.

6. In a device for controlling a characteristic of light, two pairs of electrodes, a substance capable of doubly refracting a light wave when subjected to the action of an electric field, means for simultaneously setting up in said substance two electric fields inclined at an angle to each other, said means including a source of electromotive force and circuits for simultaneously impressing energy from said source upon both said pairs of electrodes.

7. In a device for controlling a characteristic of light, two pairs of electrodes, a substance capable of doubly refracting light when subjected to the action of an electric field, means for simultaneously setting up in said substance two electric fields inclined at an angle to each other, said means including a plurality of sources of electromotive force and circuits for simultaneously impressing the sum of two electromotive forces derived from said sources on one pair of electrodes and the difference of said electromotive forces on the other pair of electrodes.

8. In a system for producing images by electrical transmission, a source of image current, and image producing means for producing an image under control of currents from said source, said means comprising a pair of crossed light polarizing devices, two sets of electrodes therebetween, the adjacent surfaces of one set of electrodes having their planes substantially perpendicular to the planes of the adjacent surfaces of the other pair, a substance between said electrodes capable of doubly refracting light when subjected to the action of an electric field, a local source of electromotive force, and means for impressing upon one set of electrodes the sum of an electromotive force derived from said local source and an electromotive force derived from said image current and upon the other set of electrodes the difference of these electromotive forces.

In testimony whereof, I have signed my name to this specification this 25th day of May, 1928.

HARRY NYQUIST.